United States Patent [19]

Hirai et al.

[11] Patent Number: 4,902,776

[45] Date of Patent: Feb. 20, 1990

[54] PREPARATION OF POLY-P-PHENYLENE WITH (1) ALUMINUM CHLORIDE AND (2) CU(I) CL OR VCL$_3$

[75] Inventors: Hidefumi Hirai, 14-10, Yutenji 1-chome, Meguro-ku, Tokyo; Naoki Toshima; Keiichi Kanaka, both of Tokyo; Atsunori Koshirai, Matsudo, all of Japan

[73] Assignee: Hidefumi Hirai, Tokyo, Japan

[21] Appl. No.: 143,036

[22] Filed: Jan. 12, 1988

[30] Foreign Application Priority Data

Feb. 19, 1987 [JP] Japan .................................. 62-36352

[51] Int. Cl.$^4$ ............................................. C08G 61/10

[52] U.S. Cl. .................................................... 528/396
[58] Field of Search ......................................... 528/396

[56] References Cited

U.S. PATENT DOCUMENTS 3,480,568  11/1969  Weichman et al. ................. 528/396

*Primary Examiner*—Harold D. Anderson
*Attorney, Agent, or Firm*—Birch, Stewart, Kolasch & Birch

[57] ABSTRACT

Poly-p-phenylene is produced by reaction of benzene with oxygen gas in the presence of a chloride of a metal having a lower valence and aluminum chloride.

6 Claims, No Drawings

PREPARATION OF POLY-P-PHENYLENE WITH (1) ALUMINUM CHLORIDE AND (2) CU(I) CL OR VCL$_3$

The present invention relates to a process in which poly-p-phenylene is prepared under mild conditions in a high yield from benzene as the starting material.

As the conventional process for preparing poly-p-phenylene, there is known a process in which benzene is subjected to oxidative cation polymerization in the presence of a Lewis acid-oxidant system [for example, aluminum chloride and copper (II) chloride which is a higher-valence metal chloride](see Journal of American Chemical Society, volume 85, pages 454–458, 1963). However, this process is disadvantageous for various points. For example, since the Lewis acid-oxidant system should be theoretically used in an equimolar amount to benzene and the majority of the reaction mixture is occupied by the metal salts, the reaction mixture is in a state of a slurry, stirring of which is difficult. Moreover, the yield of poly-p-phenylene based on the metal salt as the oxidant is lower than 100%. Moreover, since 2 moles of hydrogen chloride are formed from 1 mole of benzene in this reaction, generation of a large quantity of hydrogen chloride from the reaction system cannot be avoided.

We made research with a view to find out a process for the preparation of poly-p-phenylene, capable of preparing poly-p-phenylene in a high yield while controlling the generation of hydrogen chloride by recycling a metal salt used as the oxidant, and as the result, we have now arrived at the present invention.

In accordance with the present invention, there is provided a process for the preparation of poly-p-phenylene, which comprises reacting benzene in an oxygen-containing atmosphere in the presence of a lower-valence metal chloride [the lower-valence metal means copper (I) and vanadium (III)].

In the present invention, oxygen participates in oxidation of the metal chloride, and the oxidized metal salt participates in the polymerization reaction of benzene. The metal salt reduced by the reaction is oxidized by oxygen and again participates in polymerization of benzene, and this cycle can be repeated. In the case where the reaction is started with copper (II) chloride, which is a higher-valence metal chloride, as shown in Comparative Example 1, since both copper chloride (II) and aluminum chloride are hardly soluble in benzene, the reaction mixture is in a state of a slurry, and a large quantity of hydrogen chloride is formed. In contrast, if the reaction is started with copper (I) chloride, which is a lower-valence metal chloride, according to the present invention, as shown in Example 1, copper (I) chloride is uniformly dissolved and stirring can be performed in a good condition, and generation of hydrogen chloride is not caused.

As the lower-valence metal chloride used in the process of the present invention, there can be mentioned, for example, (1) copper (I) chloride and (2) vanadium (III) chloride. If these chlorides are used, the highest yields are obtained. When copper (I) chloride is used, the feed of copper (I) chloride should be such that the molar ratio of aluminum chloride to copper (I) chloride is higher than 1. Although the feed of benzene has no substantial influence on the yield, a higher yield is likely to be obtained as the feed of benzene is small.

As shown in Example 3, by additionally supplying aluminum chloride as excessive aluminum chloride and continuing the reaction, the yield of poly-p-phenylene can be greatly increased by at least 600% based on feed copper (I) chloride.

The reaction can be carried out at a reaction temperature of from room temperature to 80° C., but in order to increase the reaction rate, it is preferred that the reaction be carried out at a temperature slightly lower than the boiling point of benzene, that is, 60 to 70° C. The reaction can be carried out in pure oxygen, oxygen-enriched air or air, but if the reaction is carried out in an atmosphere having a high oxygen concentration, the yield can be effectively increased.

In the present invention, it is preferred that water be sufficiently removed from the reagents and apparatus used for the reaction and they be dried.

The process of the present invention is conducted mainly according to the following procedures. Namely, a reaction vessel (glass flask) is charged with a lower-valence metal chloride, aluminum chloride and benzene under a nitrogen stream, and aluminum chloride is sufficiently dissolved at room temperature to 50° C. with stirring. The atmosphere is replaced by an oxygen-containing atmosphere and the mixture is stirred at room temperature to 80° C. to effect reaction. After a predetermined time has passed, the metal salt is extracted with hydrochloric acid to obtain a reaction product. The obtained solid is washed with hot hydrochloric acid and hot water, a low-molecular-weight component dissolved in benzene is washed away with hydrochloric acid and water, and the intended poly-p-phenylene is obtained by removing benzene by distillation. From the results of the infrared absorption spectroscopy, the elemental analysis and the like, it was confirmed that obtained poly-p-phenylene has a structure substantially equal to that of poly-p-phenylene synthesized by using a Lewis acid-oxidant system.

The present invention will now be described in detail with reference to the following examples.

EXAMPLE 1

A two-necked eggplant-shaped glass flask having a capacity of 100 ml was charged with 1.57 g (15.9 millimoles) of copper (I) chloride, 6.35 g (47.6 millimoles) of aluminum chloride and 28.6 m( (318 millimoles) of benzene under a nitrogen stream, and the mixture was stirred at room temperature for 2 hours. After stirring, the atmosphere was replaced by oxygen and the system was connected to an oxygen reservoir, and the mixture was stirred at 70° C. for 24 hours. At this point, excessive aluminum chloride was left in the mixture and copper (I) chloride and aluminum chloride were homogeneously dissolved. Accordingly, the solution had a very high fluidity and stirring could be performed in a good condition. Furthermore, generation of hydrogen chloride did not occur. After completion of the reaction, 18% hydrochloric acid was added to the reaction mixture to dissolve the metal salts. The precipitate was washed with hot hydrochloric acid and hot water several times and vacuum dried at 100° C. to obtain 1.13 g of poly-p-phenylene [the yield was 187% based on feed copper (I) chloride].

The results of the analysis of the obtained poly-p-phenylene are shown below.

| Elemental analysis values | C (%) | H (%) |
|---|---|---|
| Values calculated as $(C_6H_4)_n$ | 94.7 | 5.3 |
| Found values | 92.7 | 5.0 |
| Infrared absorption (KBr pellet) $\nu_{C=0}$ 1480 cm$^{-1}$, $\delta_{C-H}$ 800 cm$^{-1}$ | | |

The benzene layer of the filtrate was separated and washed with hydrochloric acid and water, and benzene was removed by distillation to obtain 0.248 g of benzene-soluble low-molecular-weight poly-p-phenylene [the yield was 41.1% based on feed copper (I) chloride].

EXAMPLE 2

A two-necked eggplant-shaped glass flask having a capacity of 100 ml was charged with 1.00 g (10.1 millimoles) of copper (I) chloride, 4.04 g (30.3 millimoles) of aluminum chloride and 18.2 ml (202 millimoles) of benzene under a nitrogen stream, and the mixture was stirred at room temperature for 2 hours. After stirring, the atmosphere was replaced by oxygen and the mixture was stirred at 60° C. for 24 hours. After completion of the reaction, the post-treatment was carried out in the same manner as described in Example 1 to obtain 0.458 g of poly-p-phenylene [the yield was 119% based on feed copper (I) chloride]and 0.177 g of benzene-soluble low-molecular-weight poly-p-phenylene [the yield was 46.0% based on feed copper (I) chloride].

EXAMPLE 3

A two-necked eggplant-shaped glass flask having a capacity of 100 ml was charged with 0.60 g (6.06 millimoles) of copper (I) chloride, 2.42 g (18.1 millimoles) of aluminum chloride and 10.9 ml (121 millimoles) of benzene under a nitrogen stream, and the reaction was carried out in the same manner as described in Example 2. After completion of reaction, 3.05 g (22.9 millimoles) of aluminum chloride was further added to the reaction mixture and reaction was further conducted at 60° C. for 24 hours. The post-treatment was carried out in the same manner as described in Example 1 to obtain 1.50 g of poly-p-phenylene [the yield was 649% based on feed copper (I) chloride]and 0.355 g of benzene-soluble low-molecular-weight poly-p-phenylene [the yield was 154% based on feed copper (I) chloride].

EXAMPLE 4

A two-necked eggplant-shaped glass flask having a capacity of 100 ml was charged with 1.04 g (10.5 millimoles) of copper (I) chloride, 4.21 g (31.6 millimoles) of aluminum chloride and 9.5 ml (106 millimoles) of benzene under a nitrogen stream, and reaction was carried out in the same manner as described in Example 2. After completion of the reaction, the post-treatment was carried out in the same manner as described in Example 1 to obtain 0.555 g of poly-p-phenylene [the yield was 139% based on feed copper (I) chloride]and 0.203 g of benzene-soluble low-molecular-weight poly-p-phenylene [the yield was 50.8% based on feed copper (I) chloride].

EXAMPLE 5

A two-necked eggplant-shaped glass flask having a capacity of 100 ml was charged with 1.15 g (11.6 millimoles) of copper (I) chloride, 4.64 g (34.8 millimoles) of aluminum chloride and 20.9 ml (232 millimoles) of benzene under a nitrogen stream and the mixture was stirred at room temperature for 2 hours. After stirring, the atmosphere was replaced by air and the mixture was stirred at 60° C. for 24 hours. After completion of the reaction, the post-treatment as carried out in the same manner as described in Example 1 to obtain 0.173 g of poly-p-phenylene [the yield was 37.6% based on feed copper (I) chloride]and 0.0744 g of benzene-soluble low-molecular-weight poly-p-phenylene [the yield was 16.8% based on feed copper (I) chloride].

EXAMPLE 6

A two-necked eggplant-shaped glass flask having a capacity of 100 ml was charged with 0.31 g (1.97 millimoles) of vanadium (III) chloride, 3.65 g (27.4 millimoles) of aluminum chloride and 8.9 ml (98.9 millimoles) of benzene under a nitrogen stream, and the mixture was stirred at room temperature for 1 hour. After stirring, the atmosphere was replaced by oxygen and reaction was carried out at 60° C. for 24 hours. The post-treatment was carried out in the same manner as described in Example 1 to obtain 0.678 g of poly-p-phenylene [the yield was 904% based on feed vanadium (III) chloride]and 0.0498 g of benzene-soluble low-molecular-weight poly-p-phenylene [the yield was 66.4% based on feed vanadium (III) chloride].

EXAMPLE 7

A two-necked eggplant-shaped glass flask having a capacity of 100 ml was charged with 1.33 g (8.46 millimoles) of vanadium (III) chloride, 2.38 g (17.8 millimoles) of aluminum chloride and 15.2 ml (169 millimoles) of benzene under a nitrogen stream, and reaction was carried out in the same manner as described in Example 6 to obtain 0.548 g of poly-p-phenylene [the yield was 170% based on feed vanadium (III) chloride]and 0.0346 g of benzene-soluble low-molecular-weight poly-p-phenylene [the yield was 10.8% based on feed vanadium (III) chloride].

COMPARATIVE EXAMPLE 1

A two-necked eggplant-shaped flask having a capacity of 100 ml was charged with 7.62 g (57.1 millimoles) of aluminum chloride and 20.3 ml (227 millimoles) of benzene under a nitrogen stream, and 3.83 g (28.6 millimoles) of copper (II) chloride was added to the mixture and reaction was carried out at 40° C. for 2 hours under a nitrogen stream. During the reaction, the metal salts were hardly dissolved in benzene, and the reaction mixture was in a state of a slurry. Furthermore, vigorous generation of hydrogen chloride was observed. After completion of the reaction, hydrochloric acid was added to the reaction mixture. The obtained solid was washed with hot hydrochloric acid and hot water several times and vacuum-dried at 100° C. to obtain 0.842 g of poly-p-phenylene [the yield was 77.7% based on feed copper (II) chloride].

COMPARATIVE EXAMPLE 2

A two-necked eggplant-shaped glass flask having a capacity of 100 ml was charged with 2.01 g (12.8 millimoles) of vanadium (III) chloride and 23.0 ml (256 millimoles) of benzene under a nitrogen stream, and reaction was carried out in the same manner as described in Example 6. Poly-p-phenylene was not obtained at all.

What is claimed is:

1. A process for the preparation of poly-p-phenylene which comprises polymerizing benzene in an oxygen-containing atmosphere in the presence of aluminum chloride and a lower-valence metal chloride selected from the group consising of copper (I) chloride and vanadium (III) chloride, at a temperature of room temperature to 80° C.

2. A process for the preparation of poly-p-phenylene according to claim 1, wherein aluminum chloride is additionally supplied midway during the reaction.

3. The process according to claim 1, wherein said oxygen containing atmosphere is pure oxygen.

4. The process according to claim 1, wherein said oxygen containing atmosphere is oxygen enriched air.

5. The process according to claim 1, wherein said oxygen containing atmosphere is air.

6. The process according to claim 1, wherein said aluminium chloride is supplied in excess.

* * * * *